United States Patent [19]

Tsurumaki et al.

[11] Patent Number: 5,345,591
[45] Date of Patent: Sep. 6, 1994

[54] RECEIVING SATELLITE SWITCHING APPARATUS

[75] Inventors: Takayoshi Tsurumaki; Fumiaki Ogata, both of Kawasaki, Japan

[73] Assignee: Fujitsu Limited, Kawasaki, Japan

[21] Appl. No.: 906,682

[22] Filed: Jun. 30, 1992

[30] Foreign Application Priority Data

Jul. 10, 1991 [JP] Japan .................... 3-169764

[51] Int. Cl.$^5$ ............................. H04B 1/06
[52] U.S. Cl. .................... 455/3.2; 455/131; 455/188.1; 342/362
[58] Field of Search ........ 455/3.2, 131, 168.1, 455/176.1, 180.1, 188.1, 189.1, 190.1; 342/359, 361, 362

[56] References Cited

U.S. PATENT DOCUMENTS

| | | | |
|---|---|---|---|
| 4,509,198 | 4/1985 | Nagatomi | 455/189.1 |
| 4,592,093 | 5/1986 | Ouchi et al. | 455/131 |
| 4,796,032 | 1/1989 | Sakurai et al. | 342/359 |
| 5,206,954 | 4/1993 | Inoue et al. | 455/3.2 |

FOREIGN PATENT DOCUMENTS

| | | | |
|---|---|---|---|
| 0058521 | 3/1991 | Japan | 455/3.2 |
| 0240322 | 10/1991 | Japan | 455/3.2 |
| 4234229 | 8/1992 | Japan | 455/3.2 |

*Primary Examiner*—Reinhard J. Eisenzopf
*Assistant Examiner*—Doris H. To
*Attorney, Agent, or Firm*—Armstrong, Westerman, Hattori, McLeland & Naughton

[57] ABSTRACT

When a satellite among a plurality thereof is designated as well as a polarized signal to be received from this satellite in a receiving satellite switching apparatus, a voltage changeover unit applies a DC feed voltage, which is inputted from a receiver, to whichever low-noise block converter corresponds to the satellite and polarized signal designated. The signal is applied via a coaxial cable. The low-noise block converter to which the DC feed voltage has been applied converts the designated polarized signal from the designated satellite into an intermediate-frequency signal and inputs this signal to the receiver via a mixer by means of a coaxial cable. At this time the DC voltage applied to the coaxial cable is blocked by a DC voltage blocking unit so that it will not enter circuitry which does not require this voltage.

8 Claims, 11 Drawing Sheets

RECEIVING SATELLITE SWITCHING APPARATUS

BACKGROUND OF THE INVENTION

This invention relates to a receiving satellite switching apparatus used at a receiving station for satellite communication. More particularly, the invention relates to a receiving satellite switching apparatus for receiving radio waves, which are transmitted from two or more satellites, from a multibeam antenna, and inputting a predetermined polarized-wave signal, which is from a prescribed satellite, to the tuner of a CS receiver (communication satellite receiver).

In recent years, satellites for civilian use have been launched to make possible CATV utilizing satellites, as well as satellite communication in private industry. A large number of private receiving stations have been established as a result. Among these, private receiving stations which employ a multiple-type antenna for accommodating a plurality of satellites, rather than single antenna for accommodating a single satellite, have become increasingly popular owing to reduced installation expenses and advantages in terms of installation space.

FIG. 1 is a block diagram illustrating the construction of a single-type TVRO (television receiver-only system), which is one type of satellite communication receiving station. The system includes a single antenna 1 for receiving radio waves from a satellite, an ortho-mode transducer (OMT) 2 for separating the radio waves (circularly polarized waves) received by the antenna 1 into a V-polarized signal and an H-polarized signal, and low-noise block converters (LNB) 3a, 3b for amplifying each of the polarized signals by respective internal low-noise amplifiers and then converting the amplified signals into prescribed intermediate-frequency signals by frequency converters and inputting these signals to a CS receiver 5 via respective coaxial cables (IF cables) CB1, CB1'. LNB power supplies 4a, 4b supply DC voltage of +15 V to the low-noise block converters 3a, 3b, respectively, with the internal conductor of each coaxial cable serving as the + side and the external conductor as the − side. The CS receiver 5 accepts the polarized signals from the low-noise block converters 3a, 3b as input signals, selects and detects the signal of a prescribed channel of a prescribed polarized signal and outputs this signal that has been selected and detected. The system further includes a video unit 6, such as a TV or other video device. In the arrangement described above, a V/H changeover switch (not shown) is built in the CS receiver 5. However, as indicated by the dashed line, an alternative arrangement can be adopted in which a V/H changeover switch 7 is provided on the output side of the low-noise block converters 3a, 3b and is adapted to select the prescribed polarized signal and input it to the CS receiver 5 in response to a changeover signal from the CS receiver 5.

In accordance with this single-type TVRO, the V/H selection is simply carried out within the CS receiver or by an external switch. However, since a single-type TVRO is required for every satellite, multiple-type TVROs are becoming more popular.

FIG. 2 is a block diagram showing the construction of a multiple-type TVRO. This system includes a multibeam antenna 11 for receiving radio waves (circularly polarized waves) from a plurality of satellites (satellites Nos. 1 and 2), an ortho-mode transducer (OMT) 12a for separating the radio waves received from satellite No. 1 by the multibeam antenna 11 into a V-polarized signal and an H-polarized signal, an ortho-mode transducer (OMT) 12b for separating the radio waves received from satellite No. 2 by the multibeam antenna 11 into a V-polarized signal and an H-polarized signal, and low-noise block converters (LNB) 13a~13d for amplifying polarized signals V1~H2 from each of the satellites by respective internal low-noise amplifiers and then converting the amplified signals into prescribed intermediate-frequency signals by frequency converters and inputting these signals to a CS receiver 17 via coaxial cables (IF cables) CB11~CB14. The system further includes a polarized-signal selecting switch 14 for selecting the V-polarized signal or the H-polarized signal, a satellite selecting switch 15a for selecting the V-polarized signal from satellite No. 1 or No. 2, and a satellite selecting switch 15b for selecting the H-polarized signal from satellite No. 1 or No. 2. An LNB power supply 16 supplies DC voltage of +15 V to the low-noise block converters 13a~13d conforming to the combination of the selected satellite and polarized signal via the coaxial cables CB11~CB14. The CS receiver 17 selects and detects the signal of a prescribed channel of the inputted polarized signal and outputs the signal that has been selected and detected. The system further includes a video unit 18, such as a TV or other video device.

The system is provided with a changeover unit 19 the front panel of which has a V/H selection dial 19a and a satellite selection dial 19b. The arrangement is such that a voltage of ±15 V is inputted to the selection switches 14, 15a, 15b via control cables L1, L2 in dependence upon the dial positions. The changeover unit 19 is installed indoors along with the CS receiver 17 and video unit 18, etc. The other equipment is installed outdoors.

In a case where it is desired to receive a prescribed channel of the V-polarized signal of satellite No. 1, the dials 19a, 19b of the changeover unit 19 are manipulated to select "No. 1" and "V", whereupon +15 V is applied to the selection switches 14, 15a, 15b via the control cables L1, L2, so that the switches attain the states shown in FIG. 2. As a result, +15 V is fed to the low-noise block converter 13a from the LNB power supply 16 so that the V-polarized signal of satellite No. 1 whose frequency has been converted by the low-noise block converter 13a enters the CS receiver 17. A similar operation is performed when the H-polarized signal of satellite No. 1, the V-polarized signal of satellite No. 2 and the H-polarized signal of satellite No. 2 are selected.

In this multiple-type TVRO according to the prior art, one IF cable between the indoor equipment and the outdoor equipment is sufficient. However, three or more selection switches are required in order to perform the satellite selection and the V/H selection. Furthermore, the cables L1, L2 for switch control also are necessary between the indoor equipment and the outdoor equipment. As a result, the system has a complicated construction and therefore readily malfunctions and is not easy to maintain.

Another problem with the conventional multiple-type TVRO is that the selection switches assume intermediate positions unless they are provided with the voltage of ±15 V from the changeover unit, thereby making it impossible to perform the satellite selection and the V/H selection.

Still another problem is that since the conventional multiple-type TVRO requires the cables L1, L2 for switch control, the cost of installation is high.

SUMMARY OF THE INVENTION

Accordingly, a first object of the present invention is to provide a trouble-free, easy-to-maintain receiving satellite switching apparatus in a multiple-type TVRO, which apparatus is capable of performing satellite selection and V/H selection through a simple arrangement and in an easy manner.

A second object of the invention is to provide a receiving satellite switching apparatus in a multiple-type TVRO in which a switch for selectively outputting H- and V-polarized signals from a plurality of satellites need not be provided outdoors, and in which it is unnecessary to provide switch control cables between indoor and outdoor equipment.

A third object of the invention is to provide a receiving satellite switching apparatus in which a switch for selectively outputting H- and V-polarized signals from a plurality of satellites need not be provided outdoors and only one cable is sufficient for connecting indoor equipment and outdoor equipment, as a result of which the apparatus can be installed at less installation cost and can readily accommodate a TVRO that has already been installed.

A first receiving satellite switching apparatus according to the present invention comprises low-noise block converters for converting polarized signals received from satellites by a multibeam antenna into respective prescribed intermediate-frequency signals, first DC voltage blocking units connected to output terminals of respective ones of the low-noise block converters by first coaxial cables for blocking DC feed voltages applied to the low-noise block converters via the first coaxial cables, a mixer for mixing the intermediate-frequency signals outputted by respective ones of the low-noise block converters and inputting the mixed signals to a receiver via a second coaxial cable, a second DC voltage blocking unit provided between the mixer and the receiver for blocking input, to the mixer, of a DC feed voltage outputted from the receiver via the second coaxial cable, and a voltage changeover unit for applying a DC feed voltage, which is outputted from the receiver, via the second coaxial cable to the first coaxial cable connected to whichever of the low-noise block converters corresponds to the satellite and polarized signal to be received.

In accordance with the first receiving satellite switching apparatus, a switch for selectively outputting H- and V-polarized signals from a plurality of satellites need not be provided outdoors, and it is unnecessary to provide switch control cables between indoor and outdoor equipment. As a result, satellite selection and V/H selection can be carried out easily and through a simple arrangement, failures do not readily occur and maintenance can be performed with ease.

A second receiving satellite switching apparatus according to the present invention comprises low-noise block converters for converting polarized signals received from satellites by a multibeam antenna into respective prescribed intermediate-frequency signals, first DC voltage blocking units connected to output terminals of respective ones of the low-noise block converters by first coaxial cables for blocking DC feed voltages applied to the low-noise block converters via the first coaxial cables, a mixer for mixing the intermediate-frequency signals outputted by respective ones of the low-noise block converters and inputting the mixed signals to a receiver via a second coaxial cable, a second DC voltage blocking unit provided between the mixer and the receiver for blocking input, to the mixer, of a DC voltage outputted from the receiver via the second coaxial cable, and a voltage-sensing type changeover unit for being inputted a DC voltage of a prescribed level, which corresponds to a combination of a receiving satellite and received polarized signal, from the receiver via the second coaxial cable, and inputting a DC feed voltage to the first coaxial cable connected to whichever of the low-noise block converters corresponds to the prescribed level.

In accordance with the second receiving satellite switching apparatus, a switch for selectively outputting H- and V-polarized signals from a plurality of satellites need not be provided outdoors, and indoor equipment and outdoor equipment are connected by only a single coaxial cable. As a result, installation cost can be reduced, failures do not readily occur, maintenance can be performed with ease and it is possible to readily accommodate an increase in satellites from which signals are to be received.

A third receiving satellite switching apparatus according to the present invention comprises low-noise block converters for converting polarized signals received from satellites by a multibeam antenna into respective prescribed intermediate-frequency signals, first DC voltage blocking units connected to output terminals of respective ones of the low-noise block converters by first coaxial cables for blocking DC feed voltages applied to the low-noise block converters via the first coaxial cables, a mixer for mixing the intermediate-frequency signals outputted by respective ones of the low-noise block converters and inputting the mixed signals to a receiver via a second coaxial cable, a satellite changeover unit for selecting a satellite and polarized signal to be received, generating a DC voltage of a level corresponding to a combination of the satellite and polarized signal selected and applying the generated DC voltage to the second coaxial cable, second and third DC voltage blocking units provided between the mixer and the receiver for blocking input, to the mixer and the receiver, respectively, of the DC voltage applied to the second coaxial cable from the satellite changeover unit, and a voltage-sensing type voltage changeover unit for being inputted the DC voltage of the level, which corresponds to the combination of the receiving satellite and received polarized signal, from the satellite changeover unit via the second coaxial cable, and inputting a DC feed voltage to the first coaxial cable connected to whichever of the low-noise block converters corresponds to the level of the DC voltage.

In accordance with the third receiving satellite switching apparatus, a switch for selectively outputting H- and V-polarized signals from a plurality of satellites need not be provided outdoors, and indoor equipment and outdoor equipment are connected by only a single coaxial cable. As a result, installation cost can be reduced, failures do not readily occur, maintenance can be performed with ease and it is possible to readily accommodate an increase in satellites from which signals are to be received.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 3:
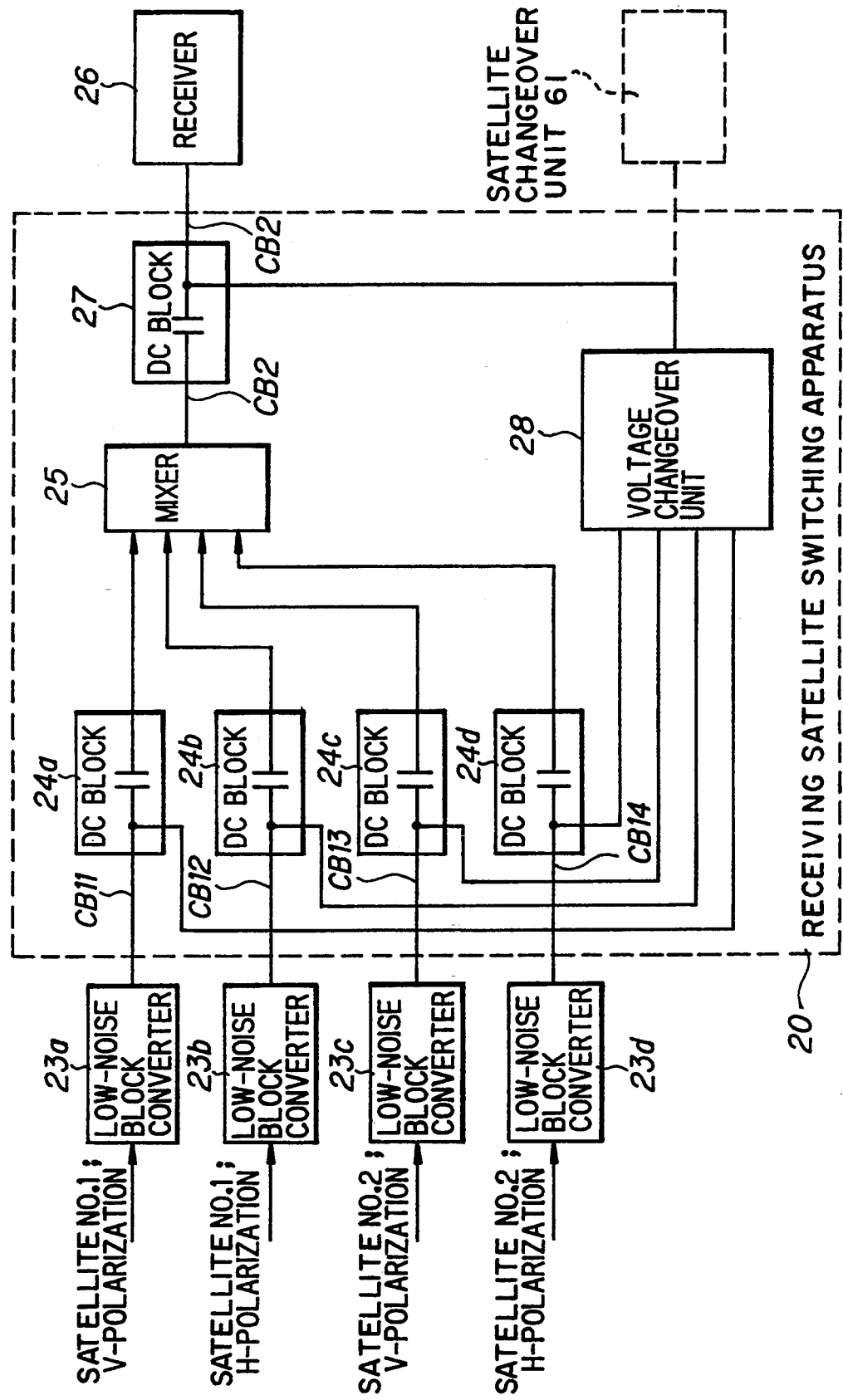
FIG. 3 is a block diagram for describing the general features of a multiple-type TVRO having a receiving satellite switching apparatus according to the present invention.

FIG. 3 is a block diagram for describing the general features of a multiple-type TVRO having a receiving satellite switching apparatus according to the present invention.

As shown in FIG. 3, numeral 20 denotes a receiving satellite switching apparatus. Connected to the switching apparatus 20 are low-noise block converters (LNB) 23a~23d for amplifying respective polarized signals (V-polarized signals and H-polarized signals) received from each of two satellites by a multibeam antenna (not shown) and then converting the amplified signals into prescribed intermediate-frequency signals. First DC voltage blocking units (DC blocks) 24a~24d composed of capacitors are connected to output terminals of respective ones of the low-noise block converters 23a~23d by first coaxial cables (IF cables) CB11~CB14, respectively, for blocking DC feed voltages to the low-noise block converters 23a~23d, these voltage being applied to the first coaxial cables. A mixer 25 mixes the intermediate-frequency signals outputted by respective ones of the low-noise block converters 23a~23d and outputs the mixed signals to a second coaxial cable (IF cable) CB2. A receiver 26 selects and detects a signal of a prescribed channel of the polarized signal inputted from the mixer 25 via the second coaxial cable CB2. A second DC voltage blocking unit 27 is provided between the mixer 25 and the receiver 26 for blocking input, to the mixer 25, of a DC feed voltage (+15 V) outputted from the receiver 26 via the second coaxial cable CB2. A voltage changeover unit 28 applies a DC feed voltage to whichever of the low-noise block converters 23a~23d corresponds to the satellite and polarized signal to be received.

When a satellite and a polarized signal to be received are designated from a control panel (not shown), the voltage changeover unit 28 inputs the DC feed voltage (+15 V), which enters from the receiver 26 via the second coaxial cable CB2, solely to whichever one of the low-noise block converters 23a~23d corresponds to the designated satellite and polarized signal to be received. The low-noise block converter LNB to which the DC feed voltage has been applied converts the designated polarized signal from the designated satellite into an intermediate-frequency signal and applies this signal to the receiver 26 via the mixer 25. At this time the DC voltage applied to each IF cable is blocked by the first and second DC voltage blocking units 24a~24d, 27 from entering the circuitry which does not require the voltage.

Thus, only the low-noise block converter LNB conforming to the designated satellite and polarized signal to be received is rendered operational by being supplied with voltage; the other low-noise block converters LNB are rendered non-operational. This means that an outdoor selection switch and outdoor switch control cables required in the prior art are no longer necessary. As a result, satellite selection and V/H selection can be carried out easily and through a simple arrangement, failures do not readily occur and maintenance can be performed with ease.

Further, the receiver 26 can be provided with a function for selecting the satellite and polarized signal, and with a function for outputting a DC voltage the level of which conforms to the combination of the selected satellite and polarized signal, and the voltage changeover unit 28 can be made to sense the level of the DC voltage outputted by the receiver 26 and to input a constant DC feed voltage to whichever low-noise block converter LNB conforms to the combination of the satellite and polarized signal to be received. If such an arrangement is adopted, the voltage changeover unit 28 can be provided outdoors, and it will suffice to connect the indoor and outdoor equipment by only the single coaxial cable (IF cable) CB2. As a result, installation cost can be reduced and the apparatus will be capable of readily accommodating an already existing TVRO.

Furthermore, a satellite changeover unit 61 (the block indicated by the dashed line) can be provided anew for selecting the satellite and polarized signal to be received, generating a DC voltage the level of which conforms to the combination of the satellite and polarized signal selected, and applying this DC voltage to the second coaxial cable CB2. In addition, the voltage changeover unit 28 is made to sense the level of the DC voltage outputted by the satellite changeover unit 61 and input a constant DC feed voltage to whichever low-noise block converter LNB conforms to the combination of the satellite and polarized signal to be received. If such an arrangement is adopted, the voltage changeover unit 28 can be provided outdoors, and it will suffice to connect the indoor and outdoor equipment by only the single coaxial cable (IF cable) CB2. As a result, installation cost can be reduced and the apparatus will be capable of readily accommodating an already existing TVRO.

First Embodiment of the Invention (a) Overall Construction

Figure 4:
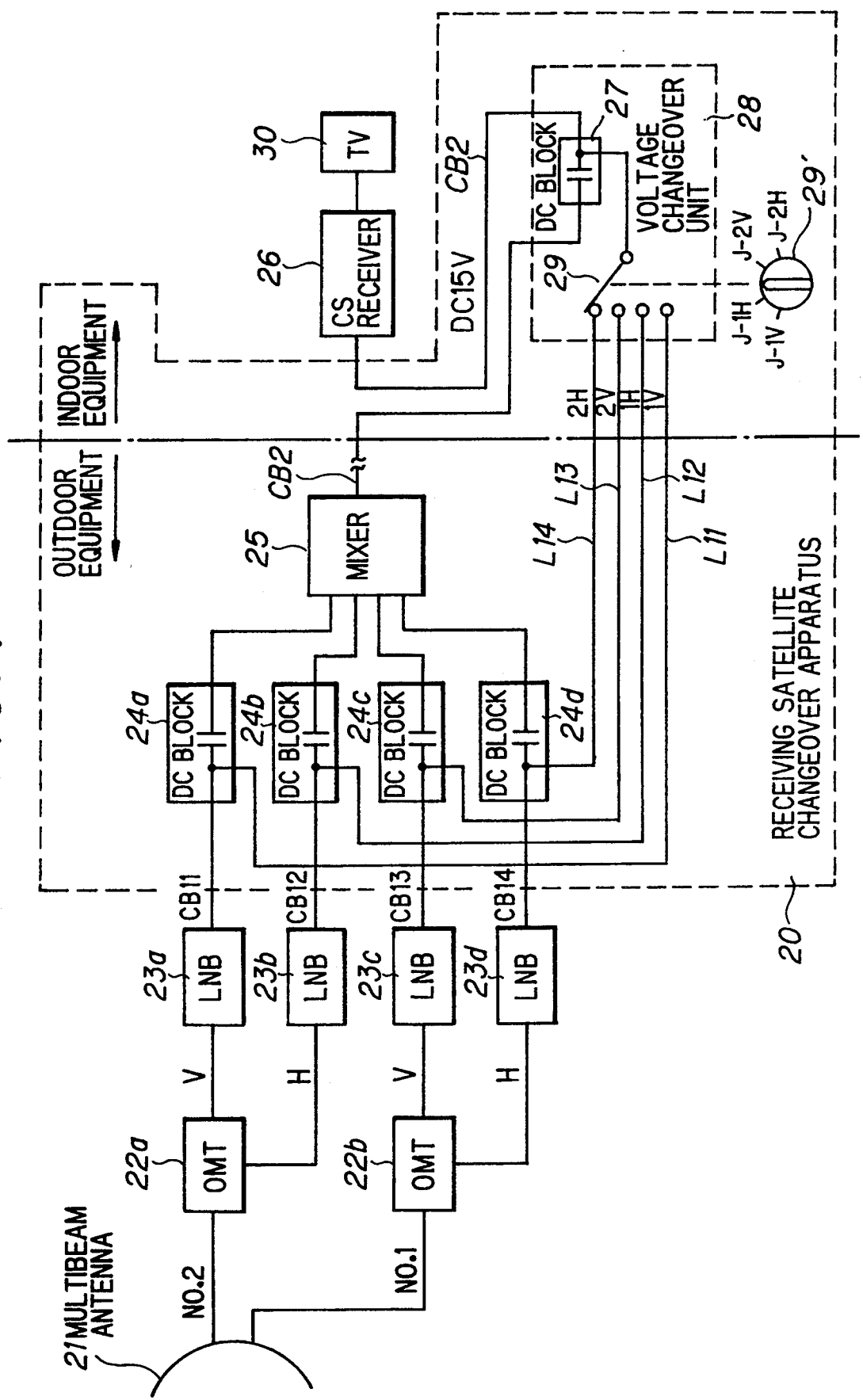
FIG. 4 is a block diagram illustrating a first embodiment of the present invention.

FIG. 4 is a block diagram illustrating a multiple-type TVRO which includes a receiving satellite switching apparatus according to a first embodiment of the present invention. Components identical to those shown in FIG. 3 are designated by like reference characters.

The receiving satellite switching apparatus is shown at numeral 20. Numeral 21 denotes a multibeam antenna for receiving radio waves sent from two or more satellites, such as a satellite JCSAT No. 1 (Japan Communication Satellite No. 1) and a satellite JCSAT No. 2. Numeral 22a denotes an ortho-mode transducer (OMT) for separating the radio waves received from satellite No. 1 by the multibeam antenna 21 into a V-polarized signal and an H-polarized signal, and numeral 22b denotes an ortho-mode transducer (OMT) for separating the radio waves received from satellite No. 2 by the multibeam antenna 21 into a V-polarized signal and an H-polarized signal. The low-noise block converters (LNB) 23a~23d convert the polarized signals from each of the satellites received by the multibeam antenna 21 into prescribed intermediate-frequency signals and output these signals via the coaxial cables (IF cables) CB11~CB14. The first DC voltage blocking units (DC blocks) 24a~24d composed of capacitors are connected to output terminals of respective ones of the low-noise block converters 23a~23d by the first coaxial cables (IF cables) CB11~CB14, respectively, for blocking DC feed voltages to the low-noise block converters 23a~23d, these voltage being applied to the first coaxial cables. The mixer 25 mixes the intermediate-frequency signals outputted by respective ones of the low-noise block converters 23a~23d and outputs the mixed signals to the second coaxial cable (IF cable) CB2. The CS (communication satellite) receiver 26 selects, detects and outputs a signal in a prescribed channel of the polarized signal inputted from the mixer 25 via the second coaxial cable CB2. The second DC voltage blocking unit 27 is provided between the mixer 25 and the CS receiver 26 for blocking input, to the mixer 25, of the DC feed voltage (+15 V) outputted from the receiver 26 via the second coaxial cable CB2. Numeral 29 denotes a voltage changeover switch for applying a DC feed voltage solely to the low-noise block converter LNB that conforms to the satellite and polarized signal to be received. Numeral 30 denotes a video unit, such as a TV or other video device.

The second DC voltage blocking unit 27 and the voltage changeover switch 29 construct the voltage changeover unit 28, which is installed indoors along with the CS receiver 26 and video unit 30, etc. The other equipment is installed outdoors. The voltage changeover unit 28 is provided with a dial 29' for selecting the combination of satellite No. 1 and the V-polarized signal (J-1V), the combination of satellite No. 1 and the H-polarized signal (J-1H), the combination of satellite No. 2 and the V-polarized signal (J-2V), and the combination of satellite No. 2 and the H-polarized signal (J-2H). The voltage changeover switch 29 applies the DC feed voltage (+15 V) to the first coaxial cables CB11~CB14 in dependence upon the position of the dial 29'.

(b) Low-Noise Block Converter LNB

Figure 5:
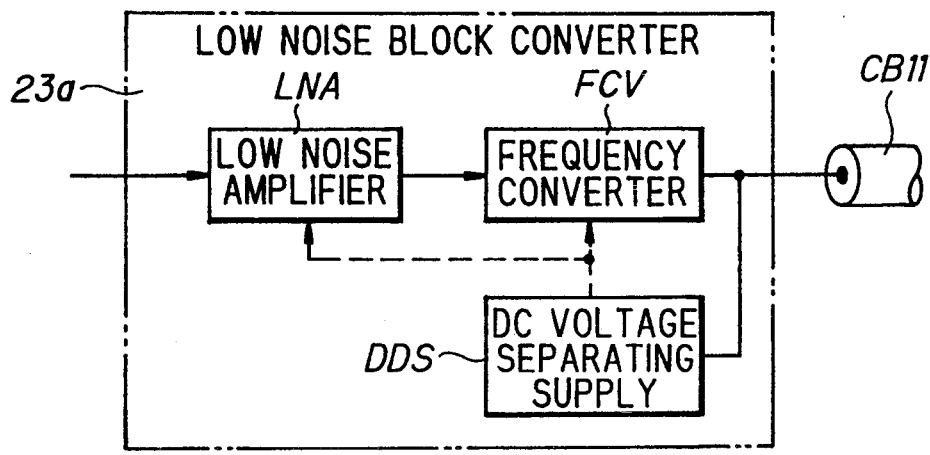
FIG. 5 is a block diagram illustrating a low-noise block converter (LNB) shown in FIG. 4.

As shown in FIG. 5, each of the low-noise block converters 23a~23d includes a low-noise amplifier LNA which amplifies the polarized signal inputted thereto, a superheterodyne-type frequency converter FCV which converts a polarized signal having a frequency of 12.25~12.75 GHz into a prescribed intermediate-frequency signal, and a DC-voltage separating supply unit DDS for separating the DC voltage of +15V applied to the coaxial cables CB11~CB14 and applying it to the low-frequency amplifier LNA and frequency converter FCV.

(c) Mixer

Figure 6:
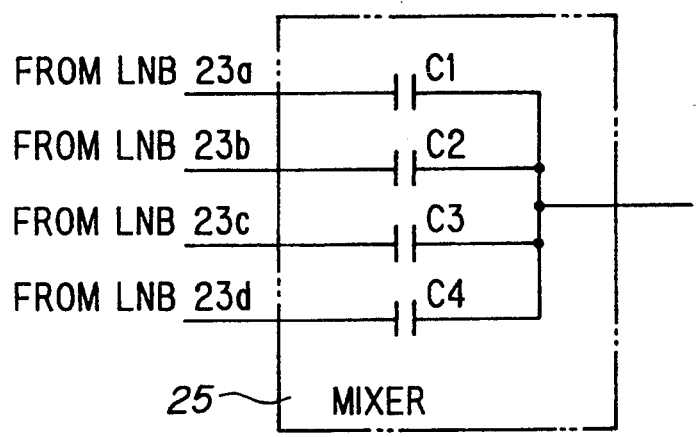
FIG. 6 is a diagram illustrating the construction of a mixer shown in FIG. 3.

As illustrated in FIG. 6, the mixer 25 includes DC-cut capacitors C1~C4 whose output sides are connected together. The intermediate-frequency signals outputted by the low-noise block converters 23a~23d enter the capacitors C1~C4, respectively. It should be noted that the number of capacitors is not limited to four. If more than four capacitors are provided, it is easier to deal with an increase in the number of satellites from which signals are to be received.

(d) CS Receiver

Figure 7:
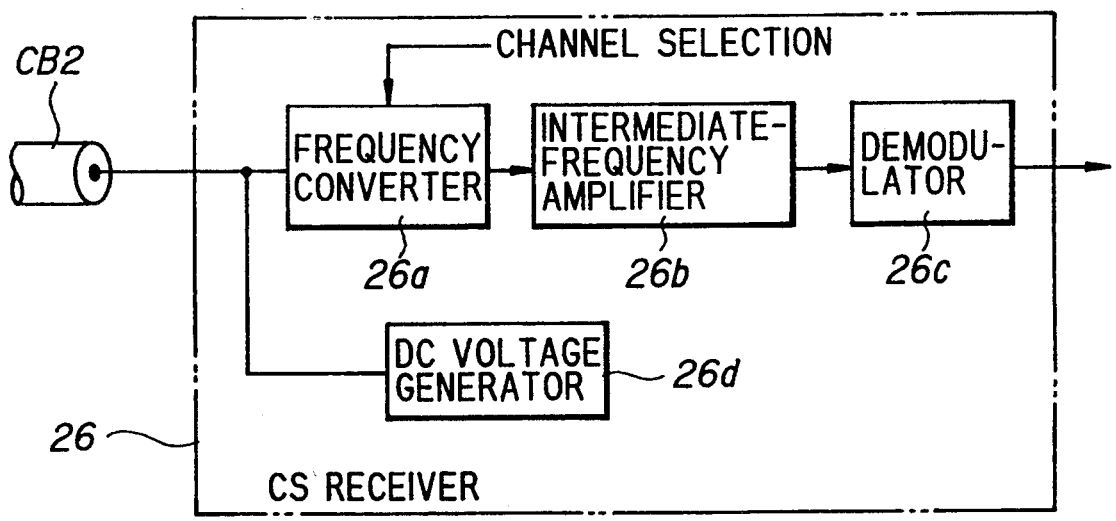
FIG. 7 is a block diagram illustrating a CS receiver shown in FIG. 4.

As shown in FIG. 7, the CS receiver 26 includes a superheterodyne-type frequency converter 26a for outputting an intermediate-frequency signal (70 MHz) on a channel designated by a control panel (not shown), an intermediate-frequency amplifier 26b for amplifying the intermediate-frequency signal, a demodulator 26c for demodulating base-band video and audio signals and applying the demodulated signals to the video unit 30, and a DC voltage generator 26d for generating the +15 V DC feed voltage applied to each of the low-noise block converters 23a~23d. The output line of the DC voltage generator 26d is connected to the core wire of the second coaxial cable CB2.

(e) Overall Operation

The CS receiver 26 inputs the DC feed voltage (+15 V) to the voltage changeover unit 28 via the second coaxial cable CB2 at all times. The arrangement is such that this DC voltage is blocked by the second DC voltage blocking unit 27 so that it will not enter the mixer 25.

If it is desired to receive a prescribed channel of the V-polarized signal from satellite No. 1 under these conditions, the dial 29' of the voltage changeover unit 28 is operated to select the combination "Satellite No. 1; V-polarization (J-1V)", whereupon the DC feed voltage (+15 V) is applied to the first coaxial cable CB11 via the control cable L11, thereby supplying the low-noise block converter 23a with DC feed voltage. It should be noted that this DC voltage is blocked by the first DC voltage blocking unit 24a so that it will not enter the mixer 25.

As a result of this operation, only the low-noise block converter 23a is rendered operational, and therefore the V-polarized signal from satellite No. 1 is converted into an intermediate frequency, amplified and then fed into the CS receiver 26 via the first coaxial cable CB11, mixer 25 and second coaxial cable CB2 in the order mentioned. The CS receiver 26 selects and detects the signal of the prescribed channel from the V-polarized signal of satellite No. 1 and inputs this signal to the video unit 30. It should be noted that operation is similar also when selecting the H-polarized signal of satellite No. 1, the V-polarized signal of satellite No. 2 and the H-polarized signal of satellite No. 2.

In accordance with the first embodiment, voltage is supplied only to the low-noise block converter LNB that conforms to the combination of the satellite and polarized signal to be received, thereby rendering this LNB operational while the other low-noise block converters are rendered non-operational. This means that an outdoor switch for selecting the satellite and signal and outdoor switch control cables required in the prior art are no longer necessary. As a result, satellite selection and V/H selection can be carried out easily and through a simple arrangement, failures do not readily occur and maintenance is facilitated.

Second Embodiment of the Invention

(a) Overall Construction

Figure 1:
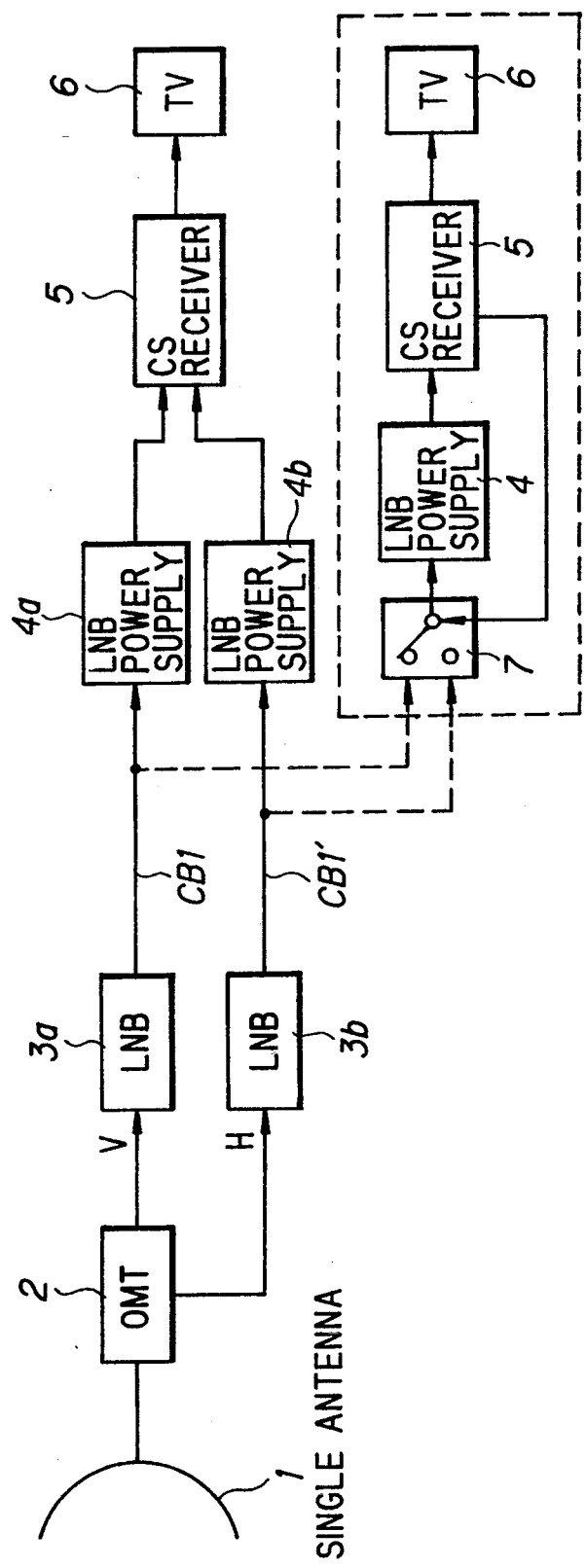
FIG. 1 is a block diagram showing the construction of a single-type TVRO according to the prior art.
Figure 2:
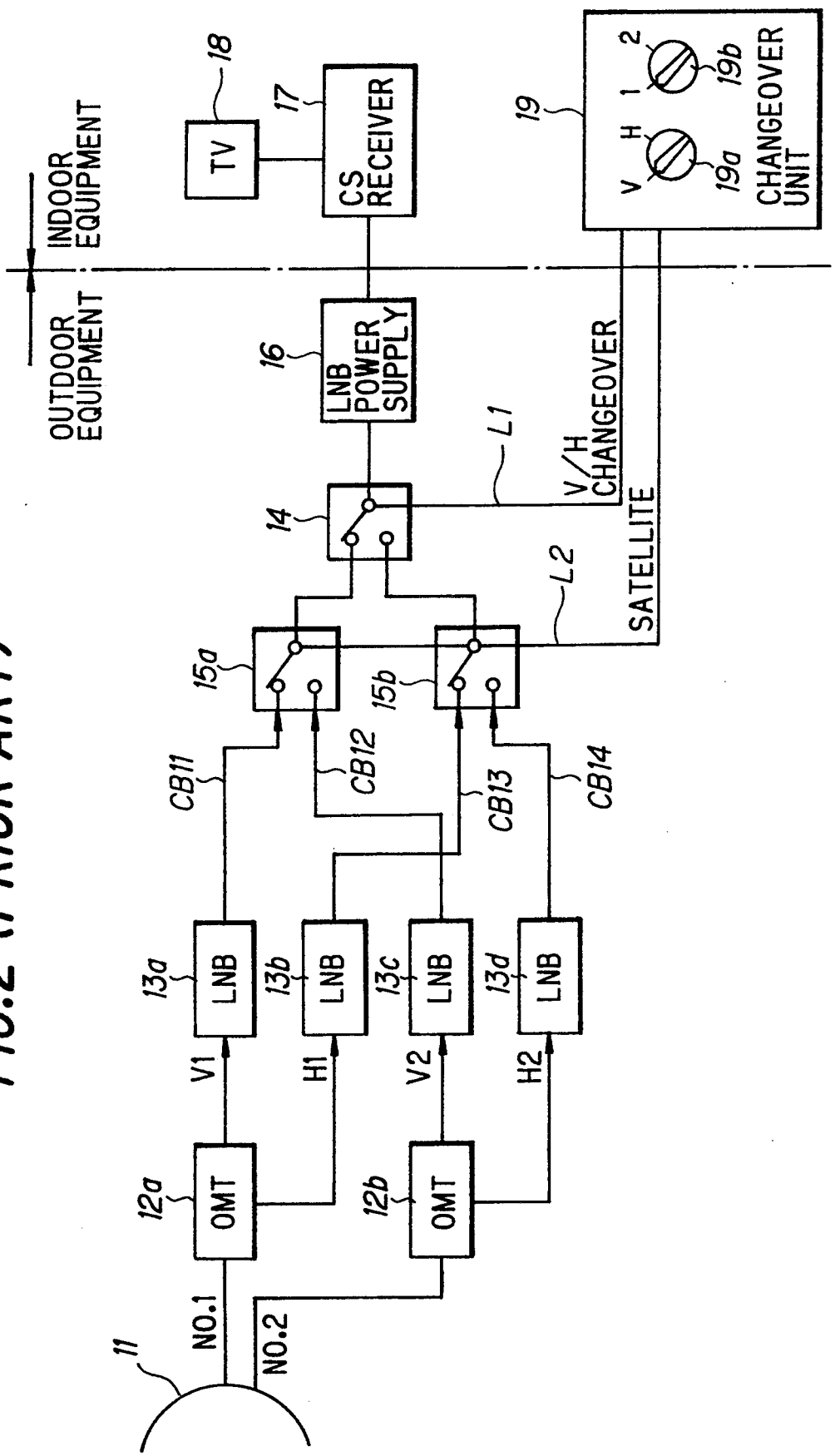
FIG. 2 is a block diagram showing the construction of a multiple-type TVRO according to the prior art.
Figure 8:
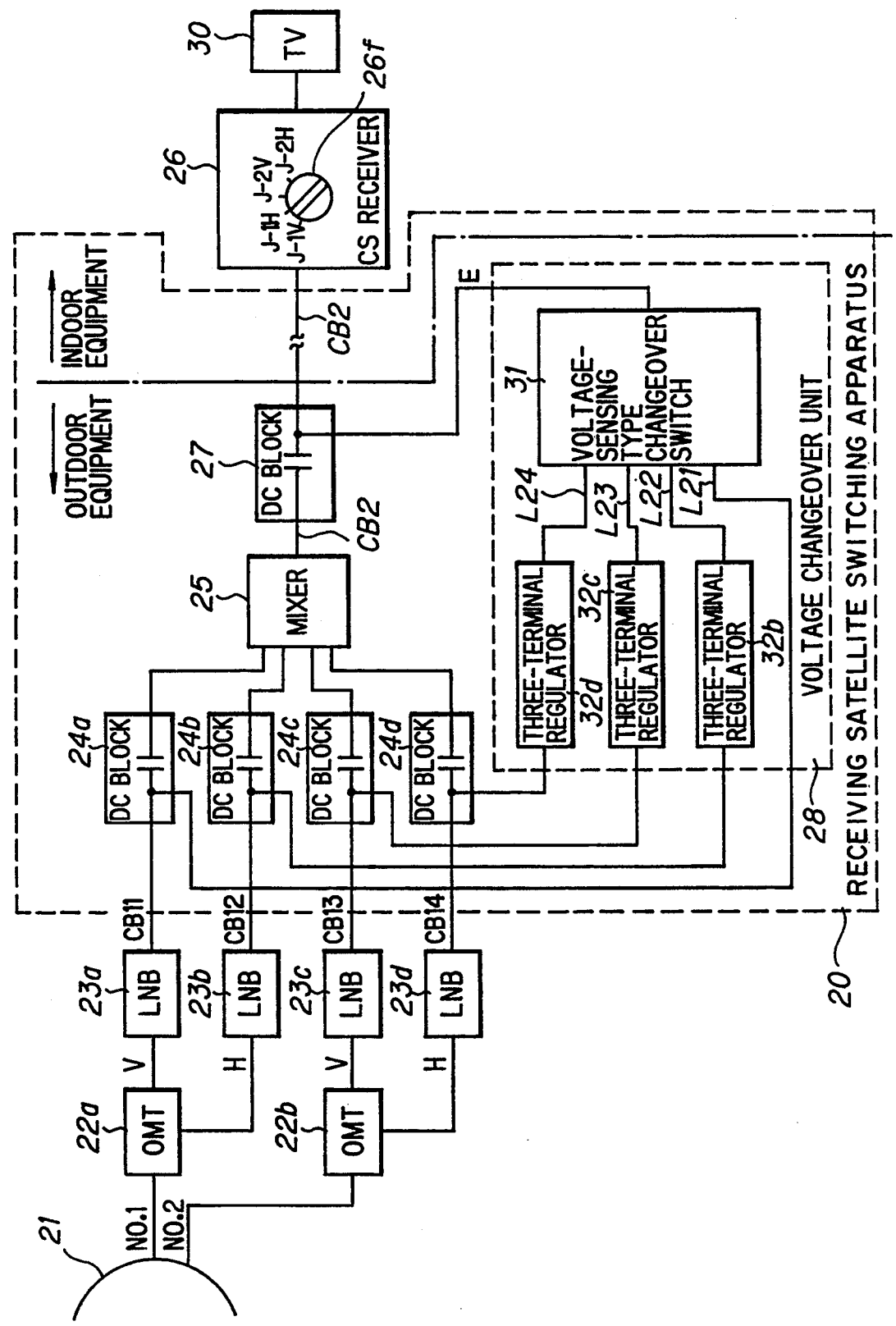
FIG. 8 is a block diagram illustrating a second embodiment of the present invention.

FIG. 8 is a block diagram illustrating a multiple-type TVRO which includes a receiving satellite switching apparatus according to a second embodiment of the present invention. Components identical to those of the first embodiment shown in FIG. 2 are designated by like reference characters.

Numeral 21 denotes the multibeam antenna, 22a the ortho-mode transducer (OMT) for separating the V-polarized signal and the H-polarized signal from the radio waves obtained from satellite No. 1, and 22b the ortho-mode transducer (OMT) for separating the V-polarized signal and the H-polarized signal from the radio waves obtained from satellite No. 2. The low-noise block converters (LNB) 23a~23d convert the polarized signals from each of the satellites received by the multibeam antenna 21 into prescribed intermediate-frequency signals and output these signals via the coaxial cables (IF cables) CB11~CB14. The first DC voltage blocking units (DC blocks) 24a~24d are connected to output terminals of respective ones of the low-noise block converters 23a~23d by the first coaxial cables (IF cables) CB11~CB14, respectively, for blocking DC feed voltages to the low-noise block converters 23a~23d, these voltage being applied to the first coaxial cables. The mixer 25 mixes the intermediate-frequency signals outputted by respective ones of the low-noise block converters 23a~23d and outputs the mixed signals to the second coaxial cable (IF cable) CB2. The CS receiver 26 inputs a DC voltage, which conforms to the combination of the satellite and polarized signal to be received, to the second coaxial cable CB2 and selects, detects and outputs a signal in a prescribed channel of the polarized signal inputted from the mixer 25 via the second coaxial cable CB2. The second DC voltage blocking unit 27 is provided between the mixer 25 and the CS receiver 26 for blocking input, to the mixer 25, of DC voltages (+30 V, +25 V, +20 V, +15 V) outputted from the CS receiver 26 via the second coaxial cable CB2. Numeral 28 denotes a voltage changeover unit for applying a DC feed voltage solely to the low-noise block converter LNB that conforms to the satellite and polarized signal to be received. Numeral 30 denotes a video unit, such as a TV or other video device. The voltage changeover unit 28 applies a DC feed voltage to whichever of the low-noise block converters 23a~23d corresponds to the satellite and polarized signal to be received. The video unit 30 is connected to the CS receiver 26.

(b) CS Receiver

Figure 9:
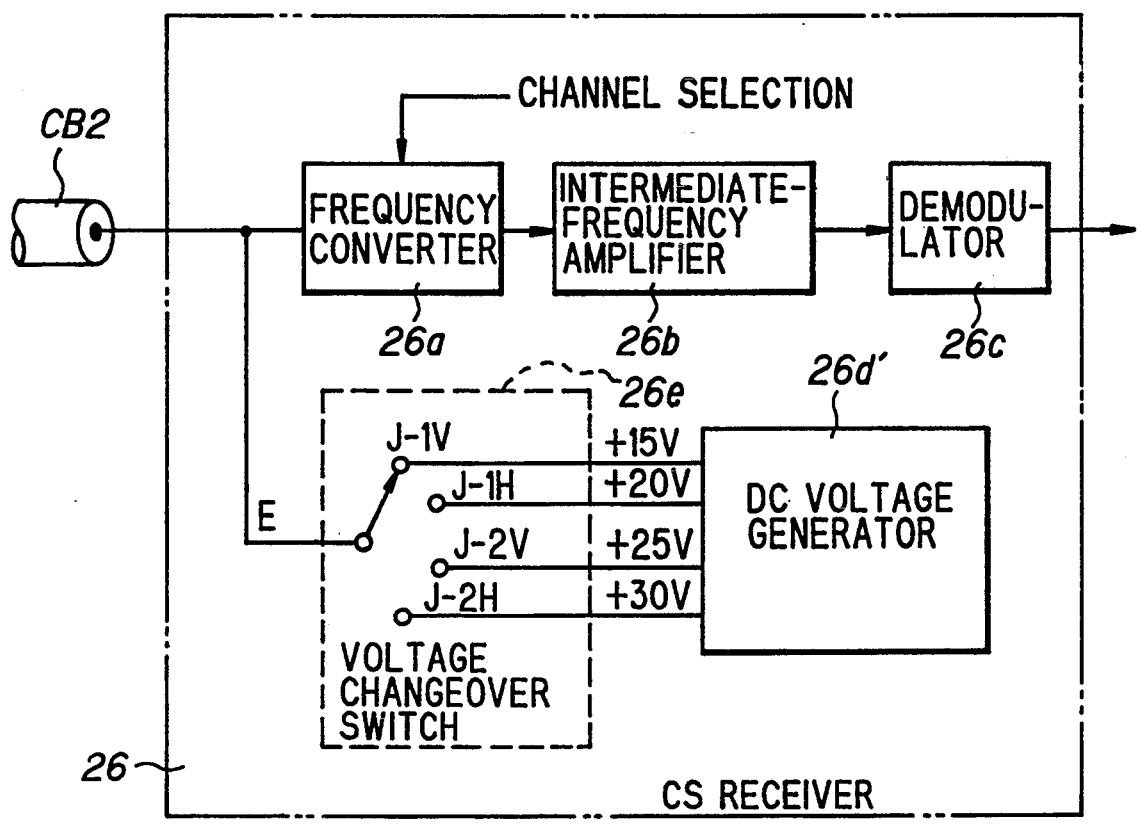
FIG. 9 is a block diagram illustrating a CS receiver shown in FIG. 8.

As shown in FIG. 9, the CS receiver 26 includes the superheterodyne-type frequency converter 26a for outputting an intermediate-frequency signal (70 MHz) on a channel designated by a control panel (not shown), the intermediate-frequency amplifier 26b for amplifying the intermediate-frequency signal, the demodulator 26c for demodulating video and audio signals and applying the demodulated signals to the video unit 30, a DC voltage generator 26d' for generating the +30 V, +25 V, +20 V, +15 V DC voltages, and a voltage changeover switch 26e for selecting and outputting the DC voltage corresponding to the combination of the satellite and polarized signal to be received. The output line of the voltage changeover switch 26e is connected to the core wire of the second coaxial cable CB2. The control panel of the CS receiver 26 is provided with a dial 26f (see FIG. 8) for selecting the combination of satellite No. 1 and the V-polarized signal (J-1V), the combination of satellite No. 1 and the H-polarized signal (J-1H), the combination of satellite No. 2 and the V-polarized signal (J-2V), and the combination of satellite No. 2 and the H-polarized signal (J-2H).

The arrangement is such that the voltage changeover switch 26e delivers the DC voltage E (+30 V, +25 V, +20 V, 15 V) of the prescribed level outputted from the DC voltage generator 26d' to the second coaxial cable CB2 in dependence upon the position of the dial 26f. More specifically, +15 V is delivered in case of the combination of satellite No. 1 and V-polarization (J-1V); +20 V in case of the combination of satellite No. 1 and H-polarization (J-1H); +25 V in case of the combination of satellite No. 2 and V-polarization (J-2V); and +30 V in case of the combination of satellite No. 2 and H-polarization (J-2H).

(c) Voltage Changeover Unit

As shown in FIG. 8, the voltage changeover unit 28 includes a voltage-sensing type changeover switch 31 for sensing the level of the DC voltage E delivered to the second coaxial cable CB2 from the CS receiver 26 and outputting this inputted DC voltage E as is to the lines L21~L24 corresponding to this voltage level, and three-terminal regulators 32b~32d serving as voltage converters for converting the inputted voltage signals into +15 V DC feed voltages and applying these voltages to the first coaxial cables CB12~CB14, respectively. The voltage changeover unit 28 is installed outdoors.

Figure 10:
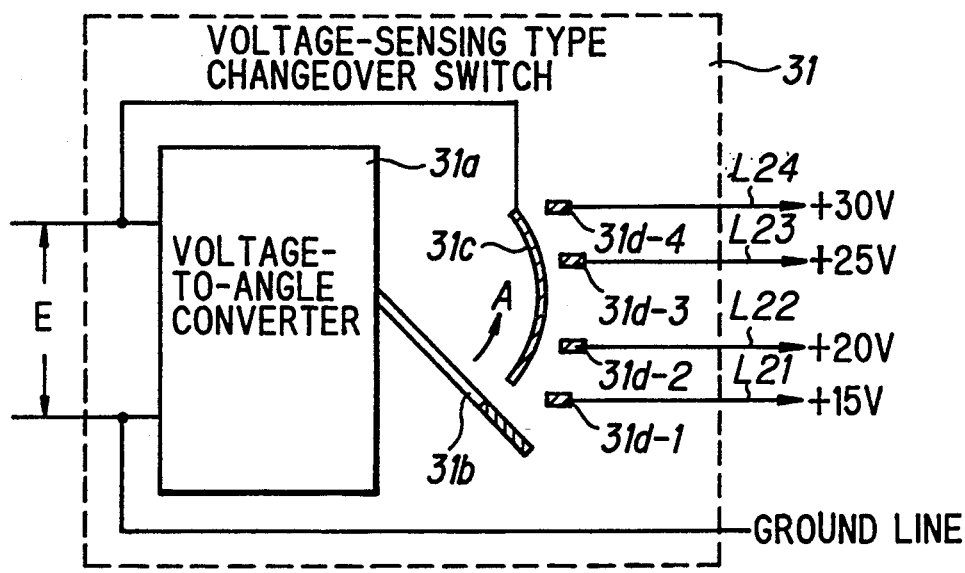
FIG. 10 is a diagram showing the construction of a voltage-sensing type voltage changeover unit shown in FIG. 8.

As illustrated in FIG. 10, the voltage-sensing type changeover switch 31 includes a voltage-to-angle converter 31a for converting the input DC voltage E into an angular deflection commensurate with the value of the voltage, a needle 31b the distal end of which is provided with a conductor, a first fixed contact 31c to which the input DC voltage E is applied, and second fixed contacts 31d-1~31d-4 for 15 V, 20 V, 25 V and 30 V, respectively. If the +15 V DC voltage E is inputted, for example, the needle 31b is rotated in the direction of arrow A through an angle commensurate with +15 V, whereby the conductive portion of the needle 31b connects the first fixed contact 31c with the second fixed contact 31d-1 so that the +15 V DC voltage is delivered to line L21.

Figure 11A:
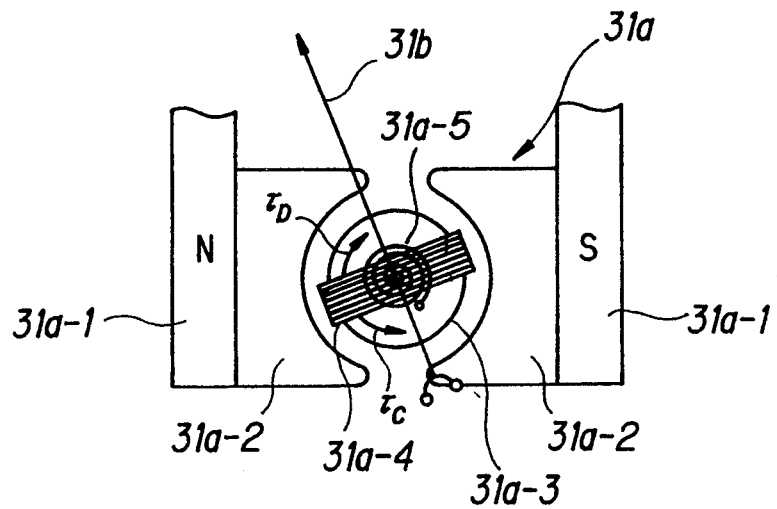
FIG. 11A is a diagram schematically illustrating the structure of a moving-coil type voltage-to-angle converter.
Figure 11B:
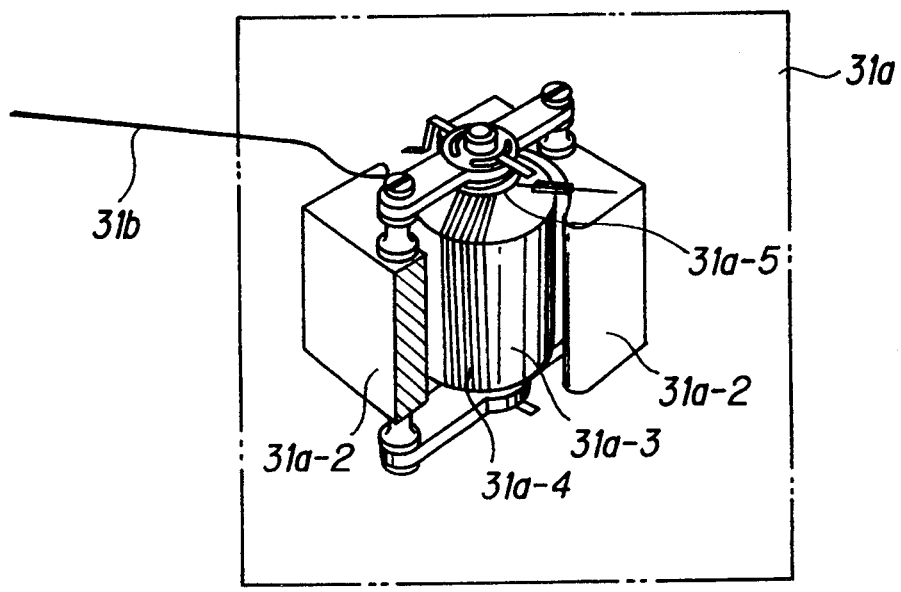
FIG. 11B is a diagram for describing the mounting of the moving coil.
Figure 11C:
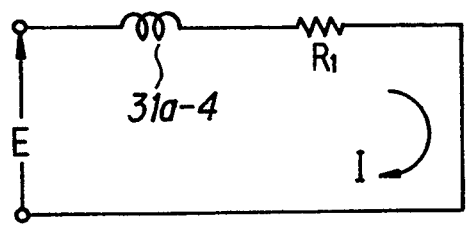
FIG. 11C is a diagram showing a circuit for inputting a voltage to the moving coil.

FIG. 11 shows the construction of the voltage-to-angle converter 31a, in which FIG. 11A is a diagram schematically illustrating the structure of a moving-coil type voltage-to-angle converter, FIG. 11B a diagram for describing the mounting of the moving coil, and FIG. 11C a diagram showing a circuit for inputting a voltage to the moving coil. The converter 31a includes a permanent magnet 31a-1, a pole piece 31a-2 which uses soft iron, a columnar soft-iron core 31a-3, a moving coil 31a-4 wound upon a rectangular frame, and a control spring 31a-5. The moving coil 31a-4 is disposed in a magnetic field having a uniform flux density produced by the permanent magnet 31a-1, pole piece 31a-2 and columnar core 31a-3. It should be noted that the permanent magnet 31a-1 is deleted from FIG. 11B.

Let B (Wb/m) represent the flux density of the magnetic field, a (m) the length of the coil, b (m) the width of the coil and n the number of turns. Under these conditions, a drive torque $\tau_D$ (N·m) produced when a current I (A) is passed through the coil 31a-4 will be given by the following equation:

$$\tau_D = IBSn \text{ (N·m)}$$

where S=a·b. The coil is rotated by the drive torque $\tau_D$ so as to wind up the control spring 31a-5. When the spring is wound up, a control torque $\tau_C$ is produced. Since the control torque $\tau_C$ is proportional to the rotational angle $\theta$ of the coil, the torque $\tau_C$ is given by the following equation:

$$\tau_C = k\theta \text{ (N·m)}$$

Since the coil stops at the position where the drive torque $\tau_D$ become equal to the control torque $\tau_C$, the rotational angle $\theta$ is given by the following equation:

$$\theta = BSnI/k = K \cdot I$$

That is, the needle 31b rotates through an angle proportional to the current, i.e, the applied voltage E.

Figure 12:
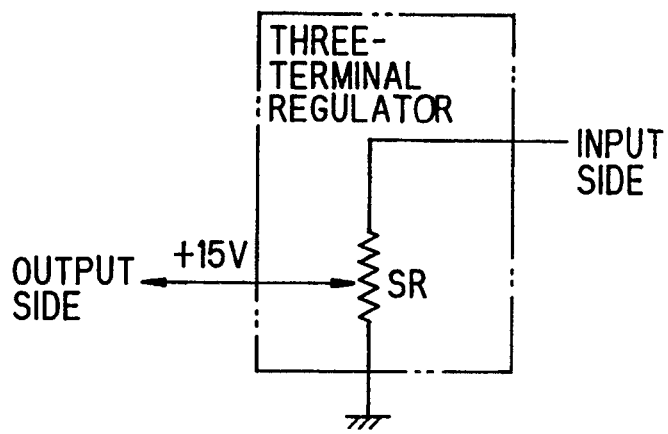
FIG. 12 is a diagram illustrating the construction of a three-terminal regulator shown in FIG. 8.

The three-terminal regulators 32b~32d are each constituted by a slide resistor SR, as depicted in FIG. 12. Each regulator converts the inputted voltage into the +15 V feed-DC voltage, which is delivered as the output signal.

(d) Overall Operation

In dependence upon the position of the dial 26f, the CS receiver 26 inputs the DC voltage of the prescribed level to the voltage changeover unit 28 via the second coaxial cable CB2. By way of example, if it is desired to receive a prescribed channel of the V-polarized signal from satellite No. 1, the dial 26f is operated to select the combination "J-1V", whereupon the CS receiver 26 inputs the +15 V DC voltage to the voltage changeover unit 28 via the second coaxial cable CB2. It should be noted that this DC voltage is blocked by the second DC voltage blocking unit 27 so that it will not enter the mixer 25.

The voltage-sensing type changeover switch 31 senses the level of the DC voltage E outputted by the CS receiver 26 and directly outputs the inputted DC voltage E (+15 V) to the line L21 corresponding to the voltage level.

The DC voltage E (+15 V) serves as the DC feed voltage and is applied to the first coaxial cable CB11 within the first DC voltage blocking unit 24a to feed the low-noise block converter 23a. It should be noted that this DC voltage is blocked by the first DC voltage blocking unit 24a so that it will not enter the mixer 25.

As a result of this operation, only the low-noise block converter 23a is rendered operational, and therefore the V-polarized signal from satellite No. 1 is converted into an intermediate frequency, amplified and then fed into the CS receiver 26 via the first coaxial cable CB11, mixer 25 and second coaxial cable CB2 in the order mentioned. The CS receiver 26 selects and detects the signal of the prescribed channel from the V-polarized signal of satellite No. 1 and inputs this signal to the video unit 30.

It should be noted that operation is similar also when selecting the H-polarized signal of satellite No. 1, the V-polarized signal of satellite No. 2 and the H-polarized signal of satellite No. 2. In these cases, however, the DC voltage outputted from the voltage-sensing type changeover switch 31 is inputted to the three-terminal regulators 32b~32d, where the voltage is converted into the +15 V DC feed voltage and then applied to the first coaxial cables CB12~CB14, respectively, to feed the low-noise block converters 23b~23d, respectively.

In accordance with the second embodiment, the voltage changeover unit 28 can be provided outdoors, and it will suffice to connect the indoor and outdoor equipment by only the single coaxial cable CB2. As a result, installation cost can be reduced and the apparatus will be capable of readily accommodating an already existing TVRO.

(e) Other Embodiment of Voltage-Sensing Type Changeover Switch

Figure 13:
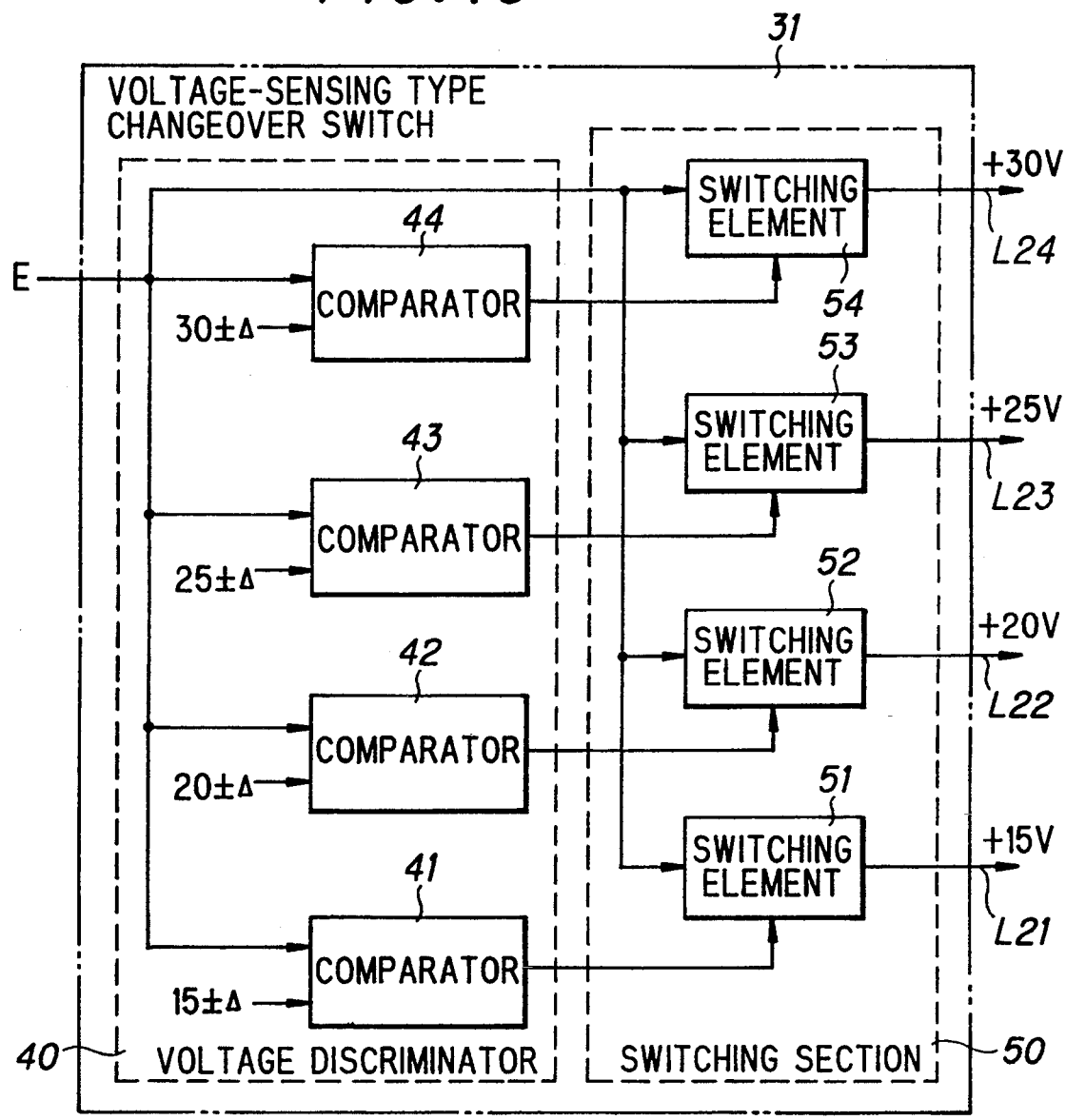
FIG. 13 is a diagram showing another construction of a voltage-sensing type voltage changeover unit.

FIG. 13 is a diagram showing the construction of another embodiment of the voltage-sensing type voltage changeover switch 31, which includes a voltage discriminator 40 and a switching section 41. The voltage discriminator 40 comprises a comparator 41 for determining whether the input DC voltage E falls within the limits of $(15-\Delta) \sim (15+\Delta)$ (where $\Delta$ is the allowable error voltage), a comparator 42 for determining whether the input DC voltage E falls within the limits of $(20-\Delta) \sim (20+\Delta)$, a comparator 43 for determining whether the input DC voltage E falls within the limits of $(25-\Delta) \sim (25+\Delta)$, and a comparator 44 for determining whether the input DC voltage E falls within the limits of $(30-\Delta) \sim (30+\Delta)$. The switching section 50 comprises a switching element 51 which turns on to deliver the input voltage E (=15 V) when $(15-\Delta) \leq E \leq (15+\Delta)$ holds, a switching element 52 which turns on to deliver the input voltage E (=20 V) when $(20-\Delta) \leq E \leq (20+\Delta)$ holds, a switching element 53 which turns on to deliver the input voltage E (=25 V) when $(25-\Delta) \leq E \leq (25+\Delta)$ holds, and a switching element 54 which turns on to deliver the input voltage E (=30 V) when $(30-\Delta) \leq E \leq (30+\Delta)$ holds.

When the DC voltage E of 15 V enters from the CS receiver 26, the comparator 41 outputs a high-level signal to turn on the switching element 51, whereby the input voltage E (=15 V) is delivered to line L21. Similarly, when the DC voltages E=20 V, E=25 V and E=30 V enter, these are outputted on the lines L22, L23 and L24, respectively, and enter the three-terminal regulators, which are the next stage.

Third Embodiment of the Invention

(a) Overall Construction

Figure 14:
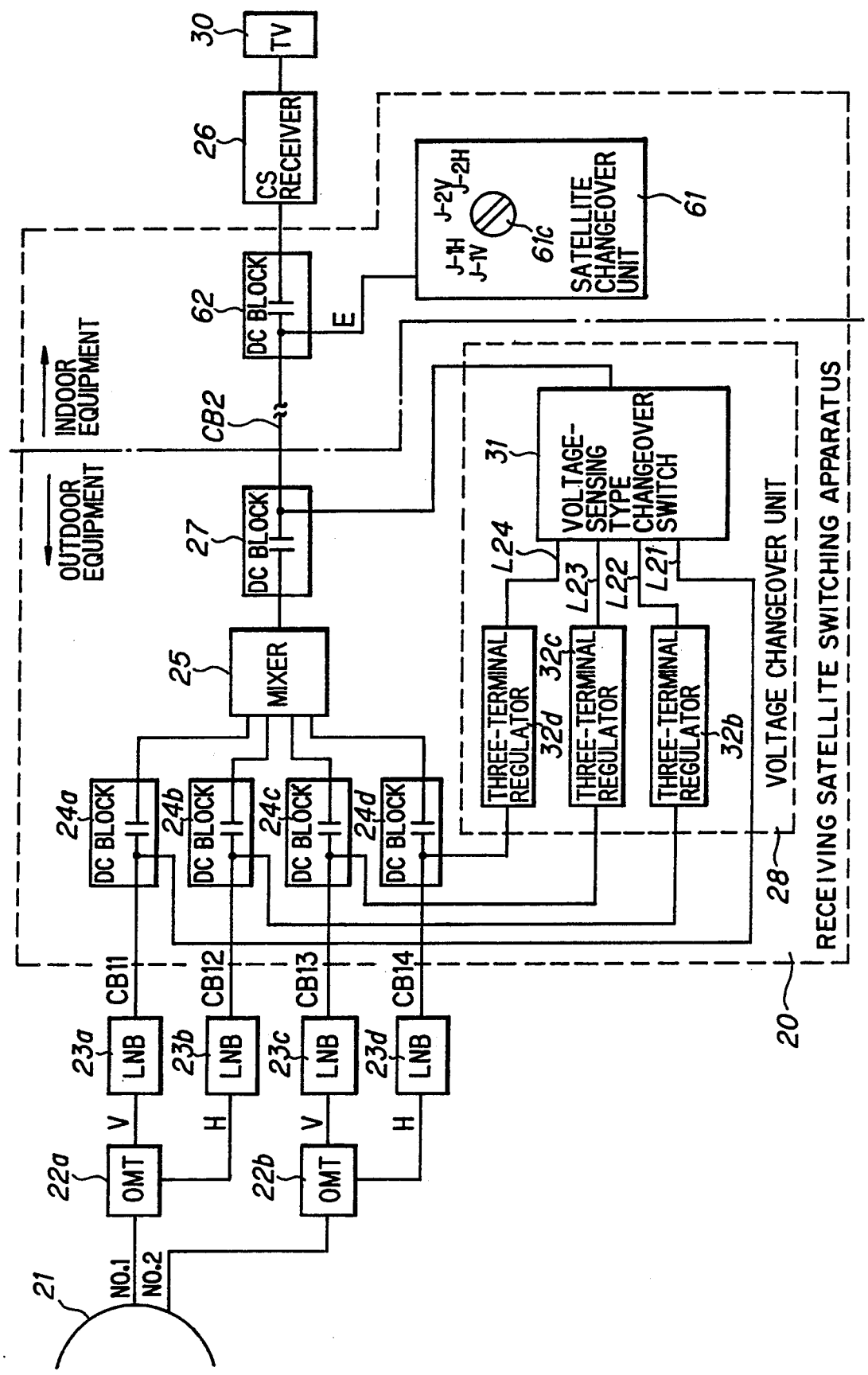
FIG. 14 is a block diagram illustrating a third embodiment of the present invention.

FIG. 14 is a block diagram illustrating a multiple-type TVRO which includes a receiving satellite switching apparatus according to a third embodiment of the present invention. Components identical to those of the second embodiment shown in FIG. 8 are designated by like reference characters. This embodiment differs from the second embodiment in the following respects:

i) A satellite changeover unit 61 is provided, in which the satellite and polarized signal to be received are selected, a DC voltage E whose level conforms to the combination of the satellite and polarized signal selected is generated, and the generated voltage is applied to the second coaxial cable CB2.

ii) Second and third DC voltage blocking units 27, 62 are provided between the mixer 25 and the CS receiver 26, whereby the DC voltage applied to the second coaxial cable CB2 from the satellite changeover unit 61 is blocked from entering the mixer 25 and CS receiver 26, respectively.

iii) The CS receiver 26 no longer has the function for selecting the satellite and polarized signal to be received.

Figure 15:
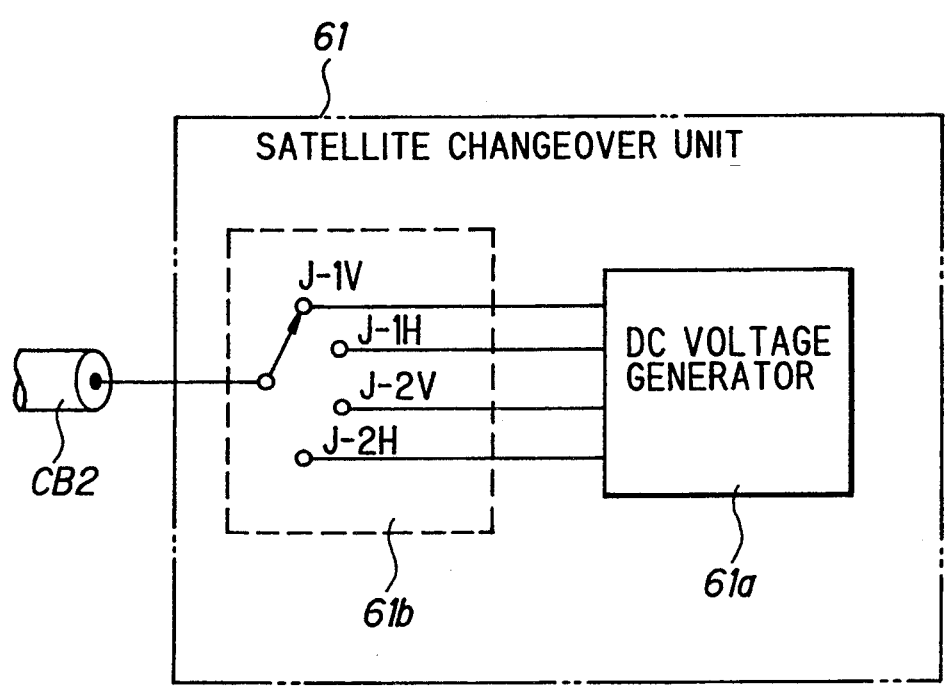
FIG. 15 is a diagram illustrating the construction of a satellite changeover unit shows in FIG. 14.

As shown in FIG. 15, the satellite changeover unit 61 includes a DC voltage generator 61a for generating DC voltages of +15 V, +20 V, +25 V, +30 V, and a voltage changeover switch 61b for selecting and outputting a DC voltage conforming to the combination of the satellite and polarized signal to be received. The output line of the voltage changeover switch 61b is connected to the core wire of the second coaxial cable CB2. The control panel of the satellite changeover unit 61b is provided with a dial 61c (see FIG. 14) for selecting the combination of satellite No. 1 and V-polarization (J-1V), the combination of satellite No. 1 and H-polarization (J-1H), the combination of satellite No. 2 and V-polarization (J-2V), and the combination of satellite No. 2 and H-polarization (J-2H).

The arrangement is such that the voltage changeover switch 61b delivers the DC voltage E (+15 V, +20 V, +25 V, +30 V) of the prescribed level outputted from the DC voltage generator 61a to the second coaxial cable CB2 in dependence upon the position of the dial 26f. More specifically, +15 V is delivered in case of the combination of satellite No. 1 and V-polarization (J-1V); +20 V in case of the combination of satellite No. 1 and H-polarization (J-1H); +25 V in case of the combination of satellite No. 2 and V-polarization (J-2V); and +30 V in case of the combination of satellite No. 2 and H-polarization (J-2H).

(b) Overall Operation

In dependence upon the position of the dial 61c, the satellite changeover unit 61 inputs the DC voltage of the prescribed level to the voltage changeover unit 28 via the second coaxial cable CB2. By way of example, if it is desired to receive a prescribed channel of the V-polarized signal from satellite No. 2, the dial 61c is operated to select the combination "J-2V", whereupon the satellite changeover unit 61 inputs the +25 V DC voltage to the voltage changeover unit 28 via the second coaxial cable CB2. It should be noted that this DC voltage is blocked by the second DC voltage blocking unit 27 so that it will not enter the mixer 25.

The voltage-sensing type changeover switch 31 senses the level of the DC voltage E outputted by the satellite changeover unit 61 and directly outputs the inputted DC voltage E (+25 V) to the line L23 corresponding to the voltage level.

The three-terminal regulator 32c converts the +25 V into +15 V, which serves as the DC feed voltage. This voltage is fed to the low-noise block converter 23a via the first coaxial cable CB13. This DC voltage is blocked by the first DC voltage blocking unit 24c so that it will not enter the mixer 25.

As a result of this operation, only the low-noise block converter 23c is rendered operational, and therefore the V-polarized signal from satellite No. 2 is converted into an intermediate frequency, amplified and then fed into the CS receiver 26 via the first coaxial cable CB13, mixer 25 and second coaxial cable CB2 in the order mentioned. The CS receiver 26 selects and detects the signal of the prescribed channel from the V-polarized signal of satellite No. 2 and inputs this signal to the video unit 30.

It should be noted that operation is similar also when selecting the V-polarized signal of satellite No. 1, the H-polarized signal of satellite No. 1 and the H-polarized signal of satellite No. 2.

In accordance with the third embodiment, as in the second embodiment described above, the voltage changeover unit can be provided outdoors, and it will suffice to connect the indoor and outdoor equipment by only the single coaxial cable CB2. As a result, installation cost can be reduced and the apparatus will be capable of readily accommodating an already existing TVRO.

Thus, in accordance with the present invention, as described above, the arrangement is such that voltage is supplied only to the low-noise block converter LNB that conforms to the combination of the satellite and polarized signal to be received, thereby rendering this LNB operational while the other low-noise block converters are rendered non-operational. This means that an outdoor switch for selecting the satellite and outdoor switch control cables required in the prior art are no longer necessary. As a result, satellite selection and V/H selection can be carried out easily and through a simple arrangement, failures do not readily occur and maintenance is facilitated.

Further, in accordance with the present invention, the receiver is provided with a function for selecting the satellite and polarized signal, and with a function for outputting a DC voltage the level of which conforms to the combination of the satellite and polarized signal selected. In addition, the voltage changeover unit is made to sense the level of the DC voltage outputted by the receiver and to input a constant DC feed voltage to whichever low-noise block converter conforms to the combination of the satellite and polarized signal to be received. As a result, the voltage changeover unit can be provided outdoors, and it will suffice to connect the indoor and outdoor equipment by only a single coaxial cable. As a result, installation cost can be reduced and the apparatus will be capable of readily accommodating an already existing TVRO.

Furthermore, a satellite changeover unit is provided for generating a DC voltage the level of which conforms to the combination of a satellite and polarized signal selected by this satellite changeover unit, and applying this DC voltage to the second coaxial cable. In addition, the voltage changeover unit is made to sense the level of the DC voltage outputted by the satellite changeover unit and input a constant DC feed voltage to whichever low-noise block converter conforms to the combination of the satellite and polarized signal to be received. As a result, the voltage changeover unit can be provided outdoors, and it will suffice to connect the indoor and outdoor equipment by only the single coaxial cable. As a result, installation cost can be reduced and the apparatus will be capable of readily accommodating an already existing TVRO.

Although a case has been described in which the receiving satellite switching apparatus of the present invention is applied to a multiple-type TVRO, it goes without saying that the apparatus is applicable also to an ordinary satellite communication receiving station.

As many apparently widely different embodiments of the present invention can be made without departing from the spirit and scope thereof, it is to be understood that the invention is not limited to the specific embodiments thereof except as defined in the appended claims.

What is claimed is:

1. A receiving satellite switching apparatus for a satellite communication receiving station in which polarized signals sent from a satellite are received by a multibeam antenna and one of the polarized signals is led to a receiver, said apparatus comprising:
   low-noise block converters for converting polarized signals, received from the satellite by the multibeam antenna, into respective prescribed intermediate-frequency signals;
   connection means, operatively connected to each output terminal of said low-noise block converters via first coaxial cables and an input terminal of said receiver via a second coaxial cable, for connecting the intermediate-frequency signal from said low-noise block converters to said receiver;
   a voltage changeover unit for selecting one of the polarized signals, and applying a DC feed voltage which is outputted from said receiver via the second coaxial cable to one of the first coaxial cables connected to whichever one of said low-noise block converters corresponds to the polarized signal selected;
   first DC voltage blocking units, provided between said low-noise block converters and said connection means, for blocking DC feed voltages applied to said connection means via the first coaxial cables; and
   a second DC voltage blocking unit, provided between said connection means and said receiver, for blocking DC feed voltages applied to said connection means via the second coaxial cable.

2. A receiving satellite switching apparatus for a satellite communication receiving station in which polarized signals sent from a satellite are received by a multibeam antenna and one of the polarized signals is led to a receiver, said apparatus comprising:
   low-noise block converters for converting polarized signals, received from the satellite by the multibeam antenna, into respective prescribed intermediate-frequency signals;
   connection means, operatively connected to each output terminal of said low-noise block converters via first coaxial cables and an input terminal of said receiver via a second coaxial cable, for connecting the intermediate-frequency signals from said low-noise block converters to said receiver;
   a voltage-sensing type changeover unit for receiving a DC voltage of a prescribed level, which corresponds to one of the polarized signals, from said receiver via the second coaxial cable, and inputting a DC feed voltage to one of the first coaxial cables connected to whichever one of the low-noise block converters corresponds to the prescribed voltage level;
   first DC voltage blocking units, provided between said low-noise block converters and said connection means, for blocking DC feed voltages applied to said connection means via the first coaxial cables; and
   a second DC voltage blocking unit, provided between said connection means and said receiver, for blocking DC feed voltages applied to said connection means via the second coaxial cable.

3. The apparatus according to claim 2, wherein said receiver includes:
   a selection switch for selecting one of the polarized signals to be received; and
   a DC voltage generator for outputting the DC voltage of the level corresponding to the polarized signal selected;
   said receiver outputting, to the second coaxial cable, the DC voltage of the level corresponding to the polarized signal selected.

4. The apparatus according to claim 2, wherein said voltage-sensing type voltage changeover unit includes:
   a voltage-sensing type changeover switch for sensing the level of the DC voltage inputted from the receiver and outputting the inputted DC voltage to an output terminal which corresponds to said voltage level; and
   a voltage converter connected to said output terminal of said voltage-sensing type changeover switch for converting the DC voltage inputted from said voltage-sensing type changeover switch into the DC feed voltage;
   the DC feed voltage from said voltage converter being inputted to whichever one of the low-noise block converters corresponds to the DC voltage level inputted from said receiver.

5. The apparatus according to claim 2, wherein said voltage-sensing type voltage changeover unit includes:
   a voltage level discriminator for discriminating the level of the DC voltage inputted from the receiver;
   a switching unit provided in correspondence with each DC voltage level, wherein when said switching unit is rendered operational, said switching unit outputs the DC voltage inputted from said receiver; and
   a voltage converter for converting the DC voltage inputted from each switching unit into the DC feed voltage;
   wherein whichever switching unit corresponds to the DC voltage level inputted from said receiver is rendered operational so that the DC feed voltage from said voltage converter is inputted to one of the low-noise block converters.

6. A receiving satellite switching apparatus for a satellite communication receiving station in which polarized signals sent from a satellite are received by a multibeam antenna and one of the polarized signals is led to a receiver, said apparatus comprising:
   low-noise block converters for converting polarized signals, received from the satellite by the multibeam antenna, into respective prescribed intermediate-frequency signals;

connection means, operatively connected to each output terminal of said low-noise block converters via first coaxial cables and an input terminal of said receiver via a second coaxial cable, for connecting the intermediate-frequency signals from said low-noise block converters to said receiver;

a satellite changeover unit for selecting one of the polarized signals, generating a DC voltage of a level corresponding to a polarized signal selected and applying the generated DC voltage to the second coaxial cable;

first DC voltage blocking units, provided between said low-noise block converters and said connection means, for blocking DC feed voltages applied to said connection means via the first coaxial cables;

second and third DC voltage blocking units provided between said connection means and said receiver for blocking input, to said connection means and said receiver, respectively, of the DC voltage applied to the second coaxial cable from said satellite changeover unit; and a voltage-sensing type changeover unit for receiving the DC voltage of the level, which corresponds to the polarized signal, from said satellite changeover unit via the second coaxial cable, and inputting a DC feed voltage to one of the first coaxial cables connected to whichever one of the low-noise block converters corresponds to the level of said DC voltage.

7. The apparatus according to claim 6, wherein said voltage-sensing type voltage changeover unit includes:

a voltage-sensing type changeover switch for sensing the level of the DC voltage inputted from said satellite changeover unit and outputting the inputted DC voltage to an output terminal which corresponds to said voltage level; and a voltage converter connected to said output terminal of said voltage-sensing type changeover switch for converting the DC voltage inputted from said voltage-sensing type changeover switch into the DC feed voltage;

the DC feed voltage from said voltage converter being inputted to whichever one of the low-noise block converters corresponds to the DC voltage level inputted from said satellite changeover unit.

8. The apparatus according to claim 6, wherein said voltage-sensing type voltage changeover unit includes:

a voltage level discriminator for discriminating the level of the DC voltage inputted from said satellite changeover unit;

a switching unit provided in correspondence with each DC voltage level, wherein when said switching unit is rendered operational, said switching unit outputs the DC voltage inputted from said satellite changeover unit; and a voltage converter for converting the DC voltage inputted from each switching unit into the DC feed voltage;

wherein whichever switching unit corresponds to the DC voltage level inputted from said satellite changeover unit is rendered operational so that the DC feed voltage from said voltage converter is inputted to one of the low-noise block converters.

* * * * *